United States Patent Office 2,720,532
Patented Oct. 11, 1955

2,720,532

NITRILE TREATMENT OF NICKEL CATALYST TO PREVENT NUCLEAR HYDROGENATION IN REDUCTION OF ANTHRAQUINONES

Robert R. Umhoefer, Kenmore, N. Y., assignor, by mesne assignments, to Food Machinery and Chemical Corporation, San Jose, Calif., a corporation of Delaware No Drawing. Application August 21, 1952,
Serial No. 305,712

6 Claims. (Cl. 260—369)

This invention pertains to hydrogenation catalysts, and more particularly to a selectively acting nickel hydrogenation catalyst for the production of hydroquinones from quinones.

If quinones, such as naphthoquinones, anthraquinones, phenanthraquinones and other quinones are hydrogenated using a porous nickel catalyst, the so-called Raney nickel catalyst, the corresponding hydroquinones will form very easily, but the reaction is apt to proceed further, leading to nuclear hydrogenation with the formation of tetrahydro-hydroquinones. Thus, when hydrogenating 2-ethyl-anthraquinone, and the like, in the presence of Raney nickel, the reaction will not stop with the formation of the desired 2-ethylanthrahydroquinone, but will proceed to tetrahydro-2-ethylanthrahydroquinone.

It is an object of this invention to provide means to prevent nuclear hydrogenation when catalytically hydrogenating quinones.

It is a further object of this invention to produce a treated nickel catalyst that is inactive for hydrogenation of the nucleus and active toward the hydrogenation of quinones to hydroquinones.

In my copending application, Serial Number 278,739, filed March 26, 1952, the use of amines to treat the nickel catalyst to prevent nuclear hydrogenation has been described. I have now found that by treating the nickel catalyst with a nitrile, the ability of the catalyst to hydrogenate the nucleus is greatly reduced or even completely inhibited, without impairment of its ability to hydrogenate the quinones to the corresponding hydroquinones. Moreover, the effect of the treatment of this invention is a relatively lasting one.

In accordance with my invention, the nickel catalyst, prior to its use in the hydrogenation reaction, is treated with a nitrile.

The following examples will serve to further illustrate the principle of my invention.

Example I

A Raney nickel catalyst was used to cause hydrogenation of 0.8 g. of 2-ethylanthraquinone dissolved in 20 ml. of a solvent mixture consisting of equal parts of ethylbenzene and tributyl phosphate. The quinone was shaken in this mixture with the Raney nickel catalyst at 30° C. under a hydrogen pressure of 750 mm. Hydrogen was absorbed at a rate corresponding to 62 ml./minute/gram during the formation of 2-ethylanthrahydroquinone. After all the quinone had reacted in this manner, hydrogen absorption continued at a rate corresponding to 0.59 ml./minute/gram with the formation of the corresponding amount of tetrahydro-2-ethylanthrahydroquinone, this second hydrogenation step corresponding to nuclear hydrogenation.

Example II

Another sample of the same Raney nickel catalyst as used in Example I was treated with an equal volume of iso-propylalcohol in which was dissolved 2% of acetonitrile calculated on the weight of the catalyst. The catalyst was mixed with the acetonitrile solution and left standing for 24 hours at room temperature. The required volume of catalyst was then withdrawn from the mixture and used in the same manner as described in Example I to hydrogenate 0.8 g. of 2-ethylanthraquinone. After the quantity of hydrogen necessary for the formation of 2-ethylanthrahydroquinone had been absorbed, no further uptake in hydrogen occurred, indicating that nuclear hydrogenation was completely prevented.

Example III

Another sample of the same Raney nickel catalyst as used in Example I was treated with an equal volume of iso-propylalcohol in which was dissolved 2% of acrylonitrile calculated on the weight of the catalyst. The catalyst was mixed with the acrylonitrile solution and left standing for 24 hours at room temperature. The required volume of catalyst was then withdrawn from the mixture and used in the same manner as described in Example I to hydrogenate 0.8 g. of 2-ethylanthraquinone. After the quantity of hydrogen necessary for the formation of 2-ethylanthrahydroquinone had been absorbed, no further uptake in hydrogen occurred, indicating that nuclear hydrogenation was completely prevented.

Example IV

Another sample of the same Raney nickel catalyst as used in Example I was treated with an equal volume of iso-propylalcohol in which was dissolved 2% of benzonitrile calculated on the weight of the catalyst. The catalyst was mixed with the benzonitrile solution and left standing for 24 hours at room temperature. The required volume of catalyst was then withdrawn from the mixture and used in the same manner as described in Example I to hydrogenate 0.8 g. of 2-ethylanthraquinone. After the quantity of hydrogen necessary for the formation of 2-ethylanthrahydroquinone had been absorbed, no further uptake in hydrogen occurred, indicating that nuclear hydrogenation was completely prevented.

In all these experiments, hydroquinone formation was not impaired as substantially stoichiometric amounts of hydrogen necessary for hydroquinone formation from the quinone were absorbed.

It will be understood that the above examples are given merely to illustrate the principles of the invention and not to be limitative thereof. Porous nickel catalysts of the Raney type may be treated in order to restrict the action of hydrogen to reduction of the quinone group to hydroquinone and prevent nuclear hydrogenation by using organic nitriles generally as treating agents, and particularly the aliphatic nitriles of less than 8 carbon atoms. Thus, one may employ acetonitrile, propionitrile, butyronitrile or valeronitrile, or aromatic nitriles, such as benzonitrile.

The treatment of the catalyst is simple in operation, and generally comprises contact of the catalyst with the nitrile, as for instance, by impregnation. The nitrile may be carried in solution in a suitable solvent or a small quantity of the nitrile may be incorporated in the working solution in which the quinone is to be hydrogenated.

The preferred method of treating the catalyst is to immerse the same in and agitate it with the solution of the nitrile in order to obtain effective absorption thereof by the catalyst. This operation may be performed at room temperature. The excess of the solution may be readily removed from the catalyst by simple filtration or other conventional separation procedure. The impregnated and treated catalyst is then immediately ready for use in the hydrogenation reaction.

What is claimed is:

1. In the process of hydrogenating anthraquinones dissolved in liquid phase and in the presence of a nickel

3 catalyst, the method of preventing nuclear hydrogenation which comprises carrying out the reaction in the presence of an organic nitrile.

2. In the process of hydrogenating anthraquinones dissolved in liquid phase and in the presence of a nickel catalyst, the method of preventing nuclear hydrogenation which comprises treating the nickel catalyst prior to its use with an organic nitrile.

3. In the process of hydrogenating anthraquinones dissolved in liquid phase and in the presence of a nickel catalyst, the method of preventing nuclear hydrogenation which comprises treating the nickel catalyst prior to its use with acetonitrile.

4. In the process of hydrogenating anthraquinones dissolved in liquid phase and in the presence of a nickel catalyst, the method of preventing nuclear hydrogenation which comprises treating the nickel catalyst prior to its use with acrylonitrile.

5. In the process of hydrogenating anthraquinones dissolved in liquid phase and in the presence of a nickel catalyst, the method of preventing nuclear hydrogenation which comprises treating the nickel catalyst prior to its use with benzonitrile.

6. In the process of hydrogenating anthraquinones dissolved in liquid phase and in the presence of a nickel catalyst, the method of preventing nuclear hydrogenation which comprises treating the nickel catalyst prior to its use with an aliphatic nitrile of less than 8 carbon atoms.

References Cited in the file of this patent

UNITED STATES PATENTS 2,495,521     Hannion et al. _____ Jan. 24, 1950

OTHER REFERENCES

Anisimov et al.: Chem. Abstracts, 32, col. 5773 (1938) 1 page.